United States Patent [19]

Nixdorf

[11] Patent Number: 5,087,272
[45] Date of Patent: Feb. 11, 1992

[54] FILTER AND MEANS FOR REGENERATION THEREOF

[76] Inventor: Richard D. Nixdorf, 11317 Snyder Dr., Knoxville, Tenn. 37932

[21] Appl. No.: 599,132

[22] Filed: Oct. 17, 1990

[51] Int. Cl.$^5$ ............................................. B01D 46/00
[52] U.S. Cl. ........................................ 55/96; 55/466; 55/523; 55/DIG. 30; 60/275; 60/311
[58] Field of Search .................. 55/96, 213, 215, 267, 55/268, 282, 466, 523, DIG. 30; 60/275, 303, 311; 422/178–180

[56] References Cited

U.S. PATENT DOCUMENTS

| | | | |
|---|---|---|---|
| 4,102,127 | 7/1978 | Saiki et al. | 60/284 |
| 4,319,896 | 3/1982 | Sweeney | 55/213 |
| 4,548,625 | 10/1985 | Ishida et al. | 55/282 |
| 4,744,216 | 5/1988 | Rao et al. | 60/303 |
| 4,878,928 | 11/1989 | Wagner et al. | 55/282 |

FOREIGN PATENT DOCUMENTS

| | | | |
|---|---|---|---|
| 58-114 | 4/1984 | Japan | 60/275 |
| 11414 | 1/1986 | Japan | 60/275 |
| 304022 | 12/1989 | Japan | 55/523 |

Primary Examiner—Bernard Nozick
Attorney, Agent, or Firm—Pitts and Brittian

[57] ABSTRACT

Method and filter apparatus for the removal of volatilizable particulate material from gas streams containing the same, and the regeneration of the apparatus when removal efficiency has decreased to a selected value. The apparatus includes a filter element fabricated, in the preferred embodiment from silicon carbide whiskers which are capable of converting microwave energy to thermal energy, with the porosity of the filter element being about 25 microns±50%. This filter element, when removal efficiency has decreased to the selected value, is heated uniformly with microwave energy, which couples to the silicon carbide whiskers to convert the microwave energy to thermal energy, for a time sufficient to raise the silicon carbide whisker temperature to a value to volatilize the volatilizable particulate matter for discharge as a gas. Typically, the microwave energy is about 2.45 GHz and 1000 to 3000 watts. In the preferred form, the filter element is surrounded with a thermal insulation formed from, for example, alumina or zirconia fibers. This insulation is provided with passageways for cooling using air flow. The apparatus is specifically directed to the removal of carbon-containing particulates from the exhaust of diesel-fueled engines.

13 Claims, 3 Drawing Sheets

FILTER AND MEANS FOR REGENERATION THEREOF

DESCRIPTION

1. Technical Field

This invention relates generally to filters for the removal of particulate matter containing volatilizable material from gas streams, and more particularly to a filter for the removal of carbon-containing particulate matter that incorporates a means for the regeneration of the filter by converting the carbon to carbon dioxide. The main thrust of the invention is for use with diesel engine exhausts, fossil fuel power generation plants, chemical process exhaust effluents, etc.

2. Background Art

There are many applications in industry where the processing of gas streams involves the removal of volatilizable, particularly carbon-containing, particulates. One particularly important area is the treatment of the exhaust gas from diesel-type engines. Exhaust particulates from diesel engines have become one of the most severe air pollution problems. Due to the manner of burning of fuel in a diesel engine, the exhaust gas contains a considerable particulate component that is in the form of fine carbon solids. These may be the result of the condensation of carbon monoxide, for example. Environmental standards are changing such that there must be a significant reduction to the pollution of the atmosphere by the carbon monoxide as well as carbon-containing particulates. The EPA standard to which the exhausts of new heavy-duty diesel powered vehicles must meet by 1994 is 0.1 g/hp-hr (this will be the standard for city buses in 1991).

Another application for the filtering of off-gases where carbon-containing particulates is found in various of the coal gassification processes. Other applications include shale retorts and coal-fired turbines, for example.

Research has been conducted in the field of the diesel engine exhaust in order to reduce pollutants. The filter trap method is considered the most promising for the reduction of exhaust particulates. Various filter configurations have been studied, including "wall-flow" filters wherein the gases are filtered by passing from one passageway through a thin membrane into an adjacent passageway (typically in the form of a honey comb). Another type of filter that has been investigated is referred to as a "foam" filter where the gas is filtered during passage through a body having some selected porosity. These are typically fabricated from ceramic materials, such as cordierite and mullite, although some are fabricated using a wire mesh. A summary of this type of research is reported in "Advances in Diesel Particulate Control" published by the Society of Automotive Engineers, Inc. in February 1990 as Report SP-816. This is a compilation of papers presented at the 1990 SAE International Congress and Exposition.

Coupled with the filter approach is the research on the periodic regeneration of the filter when an excessive pressure drop across the filter occurs due to the particulate deposit therein. The cyclic regeneration time will differ depending upon the time duration of reaching this upper level of pressure drop, but typically will be about every 200 miles for heavy duty diesel-powered trucks. Various forms of regeneration are being considered which typically include diesel fuel burners, electrical resistance igniters, catalyst assistance and other such systems.

U.S. patents that relate to electrical heat regeneration are U.S. Pat. No. 4,319,896 issued to W. M. Sweeney on Mar. 16, 1982, U.S. Pat. No. 4,744,216 issued to V. D. N. Rao on May 17, 1988, and U.S. Pat. No. 4,548,625 issued to Y. Ishida, et al, on Oct. 22, 1985. Catalytic regeneration is described in U.S. Pat. No. 4,102,127 issued to J. Saiki, et al, on July 25, 1978.

One of the considerations of filter regeneration, as well as in regular operation, it that of structural integrity of the filter as influenced by temperature gradients within the filter and the strength of the filter material. As the carbon particles are ignited at the filter face, an intense heat flame front or line moves down the length of the filter causing thermal shock across the flame line. In an effort to reduce this problem, one group of investigators have studied the use of microwave heating of a susceptor at the face of the filter to initiate the regeneration, and a second susceptor at the bottom face to achieve comparable temperatures to thus reduce the temperature differential (and thermal gradients). This work is reported on pages 131-140 of the above-cited SAE Report and is reported to be the subject of a patent application, possibly in Canada. Whether manufactured as separate pieces (ceramic filter plus susceptors) or as an integral component, the result is simply a better igniter but which does not solve the intrinsic problems of the basic filtration unit. For example, this construction cannot give uniform heating throughout the device since there is distinctive heating at two separate points in the filter unit. Also, there is a potential of some type of "reaction" between the heater portions and the filter element itself during extended use and regeneration. Further, this structure still uses the weaker ceramic filter materials in the main portion of the filter.

In electrical resistance igniter systems failure is experienced most often as caused by corrosion of electrical connections that are exposed to the corrosive gas streams.

Accordingly, it is an object of the present invention to provide a filter for use in the removal of carbon-containing particulates, and other volitilizable materials, from gas streams wherein the filter is a monolithic structure that can be regenerated using microwave energy causing the filter to achieve a uniform temperature throughout a significant portion of the filter.

A further object of the present invention is to provide a filter element and means for regeneration of the same that does not utilize electrical connections or susceptor interfaces which would be subject to corrosion problems due to contact with the gas streams for which filtering action is desired.

Another object of the present invention is to provide a filter element fabricated from silicon carbide materials which provide for desired filtration and also couple with microwave radiation to convert microwave energy to thermal energy.

It is another object of the present invention to provide a filter fabricated from silicon carbide whiskers capable of converting microwave energy to thermal energy for use in removing carbon-containing particulates from gas streams, with means associated therewith to irradiate a major part of the filter with microwave radiation to cause the uniform burning of the carbon to achieve regeneration of the filter.

An additional further object of the present invention is to provide an improved method for the removal of carbon-containing particulates, and other volatilizable materials, from gas streams containing the same with a filter that can be uniformly heated upon demand to achieve regeneration of the filter by the volatilization of the materials held thereby using microwave radiation.

These and other objects of the present invention will become apparent upon a consideration of the detailed description that follows together with the associated drawings.

DISCLOSURE OF THE INVENTION

In accordance with the present invention, there is provided a filter element for introduction into a gas stream consisting of carbon-containing and other volatilizable particulates so as to remove these particulates from the gas, the filter element being fabricated from silicon carbide whiskers or other silicon carbide materials capable of converting microwave energy to thermal energy. The invention further has a microwave cavity associated with the filter element whereby microwave energy can be applied to the filter element to achieve a substantially uniform temperature over an adequate portion of the filter to thereby cause the carbon and other similar materials to be uniformly ignited and burned during regeneration of the filter. A pressure differential measurement across the filter element can be used to initiate regeneration, and a temperature measuring device can be used to control the microwave source generator to achieve the proper temperatures for the regeneration.

BEST MODE FOR CARRYING OUT THE INVENTION

Figure 1:
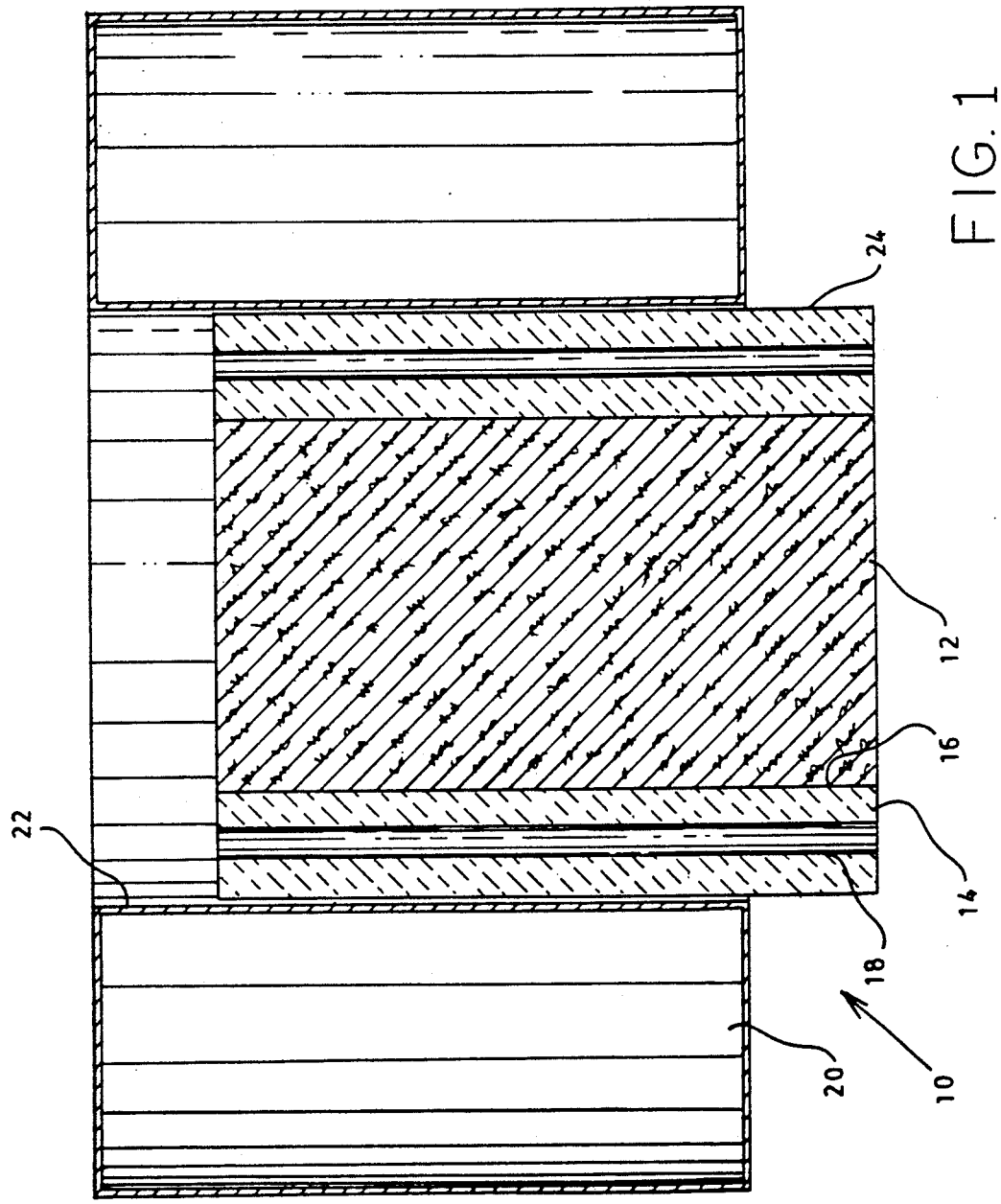
FIG. 1 is a cross-sectional drawing illustrating the essential components of the present invention, with the filter element (and its thermal insulation) being separable from the microwave cavity such that it can be replaced when necessary.

The basic components of the present invention can be best understood by referring to FIG. 1 wherein the combined filter-heater is illustrated generally at 10 therein. Centrally located within this device is a filter element 12 fabricated, in the preferred embodiment, from silicon carbide whiskers, where the term whisker refers to single crystal discontinuous fibers typically having an average thickness of up to a few micrometers and a length that is typically 10 to 100 times the thickness. A typical method of preparing the whiskers is described hereinafter. These whiskers are formed into the filter unit 12 by any suitable method. For example, these whiskers can be consolidated into a preform having, typically, a cylindrical configuration as indicated. The preform should have an nominal porosity size of 25 micrometers ±50%. Alternatively, the whiskers can be formed into a thin layer (a paper or felt) and coiled to form the filter element, again having the above-cited nominal porosity. Of course, other physical forms of the filter are envisioned within the scope of the invention.

The filter unit 12 is surrounded by a thermal insulation layer 14, typically fabricated from aluminum or zirconium oxide (alumina or zirconia) rigid fiber insulation. In the preferred construction, the insulation layer is juxtaposed against the peripheral surface 16 of the filter unit 12 such that the filter is adequately supported, and so that there is sufficient strength for manipulation during fabrication and/or replacement. Preferably, the insulation layer 14 is provided with a plurality of cooling channels 18 so as to maintain the insulation below some selected temperature.

Surrounding the filter-insulation assembly is a microwave cavity 20. This cavity is annular with respect to the filter-insulation assembly and is provided with a central opening 22 to closely accept the exterior surface 24 of the filter-insulation assembly. Thus, the filter-insulation assembly can be inserted or removed from the opening 22 for assembly or renewal of the device 10.

The components illustrated in FIG. 1 are shown as being right circular cylinders in configuration. This is the preferred form; however, they can take on other configurations depending upon the application of the device.

Figure 2:
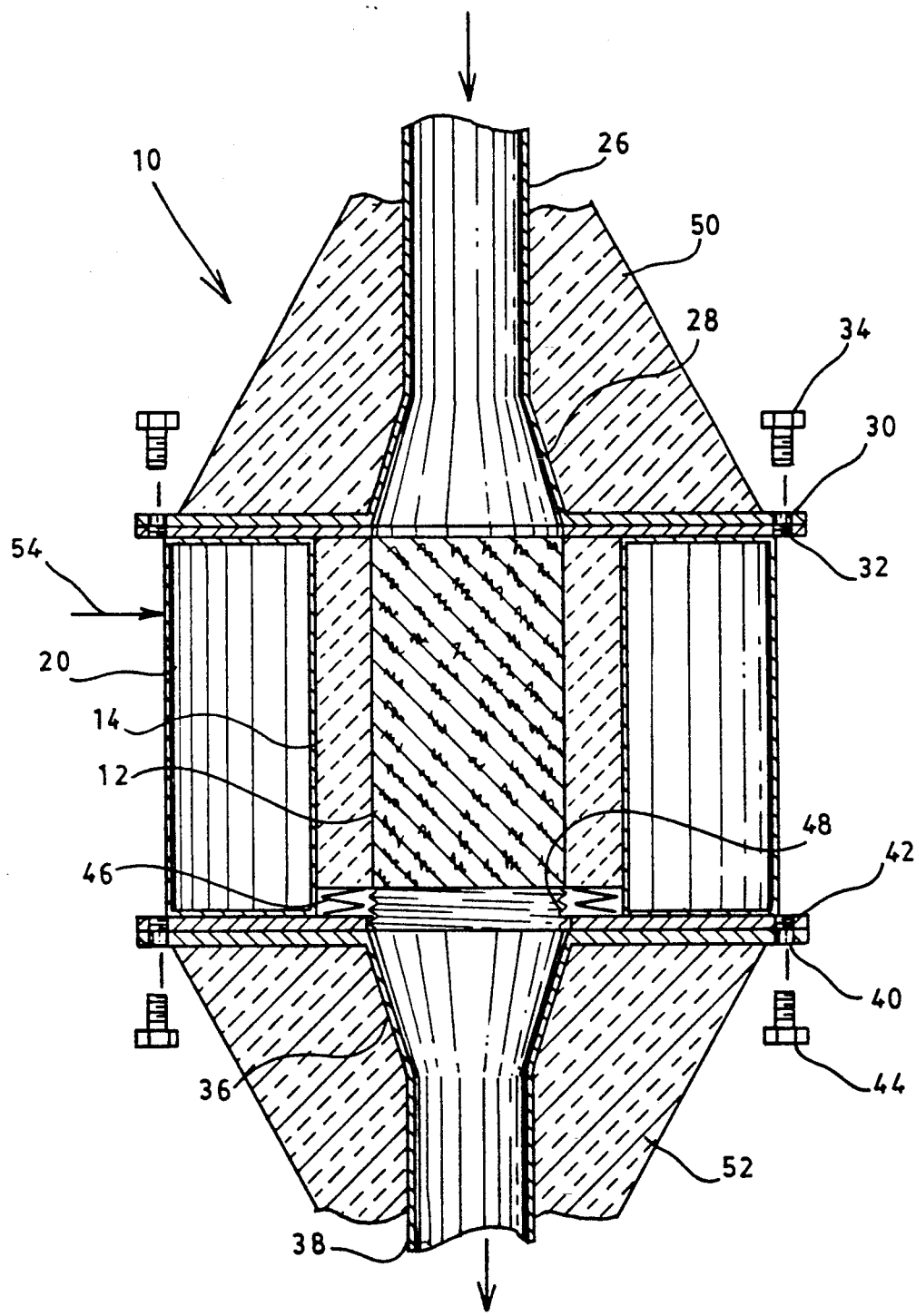
FIG. 2 is a cross-sectional drawing illustrating the present invention interposed in an exhaust system for the processing of a gas stream containing carbon-containing (and/or other volatilizable) particulates.

Referring now to FIG. 2, shown therein is a typical construction of an entire filter-heater assembly. This is not drawn to any particular scale: it is only illustrative of the general arrangement of the components. An inlet to this assembly is provided with an inlet pipe 26 that leads from the source of the gases to be filtered. Usually the diameter of this inlet pipe is smaller than the filter element unit; therefore, there is a divergent portion 28 to achieve the proper size. This divergent portion terminates in a flange 30 that is releasably attached to a flange 32 of the microwave cavity 20 as with a plurality of mechanical fasteners 34. Similarly, a convergent portion 36 of piping is usually required at the outlet from the filter unit 12 leading to an exhaust pipe 38. This convergent portion 36 likewise terminates in a flange 40 to mate with a bottom flange 42 of the microwave cavity, and is releasably attached thereto with a plurality of fasteners 44. In order to maintain the filter unit (and the insulation) against the flange 30 and to reduce road shock, there is typically provided a spring means 46, as shown. Further, to bridge any gap between the filter unit 12 and the convergent portion 36, the filter-insulation unit typically has a flexible extension sleeve 48. In order that the inlet and outlet portions of the total assembly are thermally protected, each is typically provided with insulation as at 50, 52.

Microwave energy is applied to the cavity 20, as indicated with an arrow 54, by any suitable and typical coupling means between a source of the microwave energy (see FIG. 3) and the cavity 20.

Figure 3:
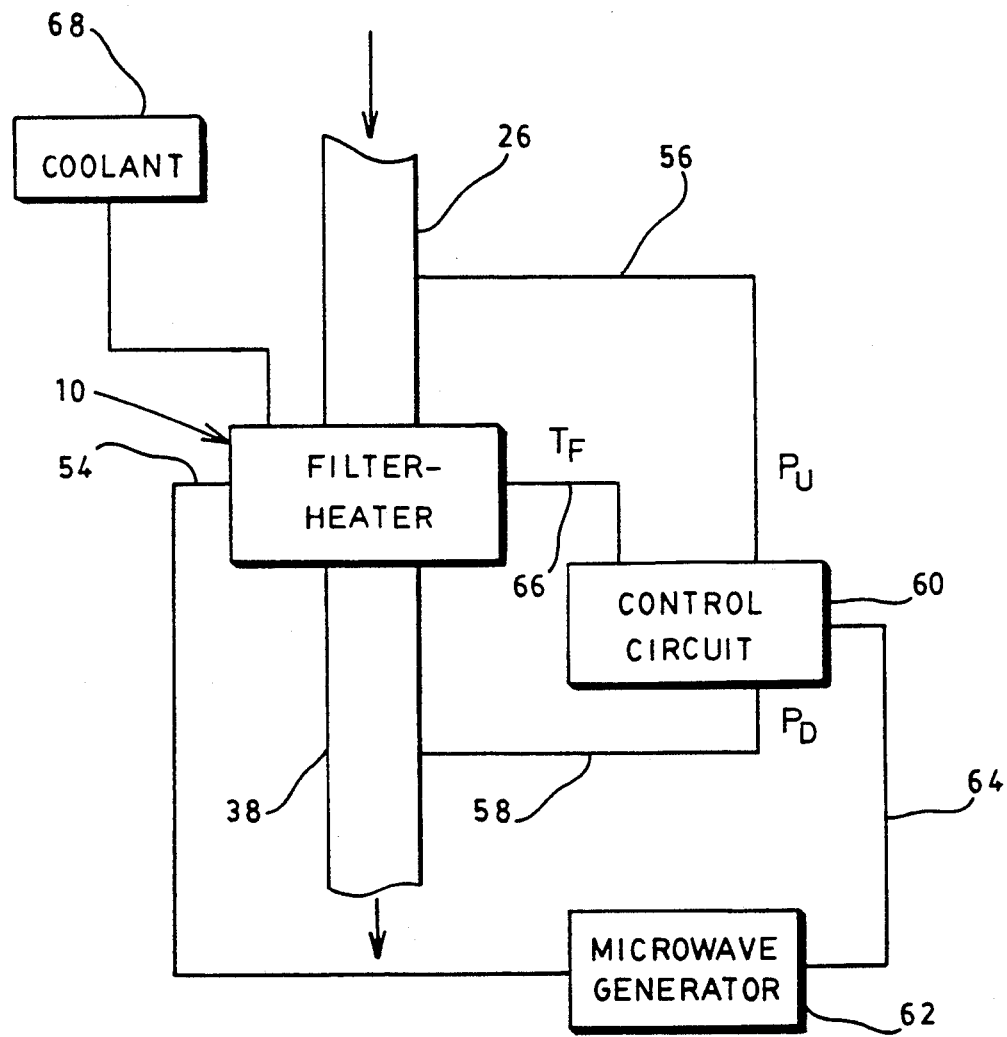
FIG. 3 is a schematic drawing illustrating the overall system of the present invention.

Operation of the present invention can be understood by referring now to FIG. 3. As illustrated, the filter-heater unit is interposed between the inlet pipe 26 and the exhaust pipe 38 (no insulation shown herein). Differential pressure between these inlet and exhaust pipes is determined using pressure lines 56 for the upstream pressure, $P_U$, and 58 for the downstream pressure, $P_D$. These pressures are impressed upon a control circuit 60 whereby when the differential pressure exceeds a preset value, regeneration of the filter-heater unit is initiated. The first step in this regeneration is typically establishing a bypass for the filter-heater unit (by apparatus not shown but of conventional design). Thereafter, a microwave generator 62 is activated by an output signal from the control circuit 60 via lead 64. The microwave energy, typically about 2.45 GHz at about 1 KW to about 3 KW, is conveyed to the filter-heater 10 by the aforementioned coupling 54 whereby the internal filter unit is uniformly heated to typically about 600-800 degrees C. This specific frequency range is found to couple well with the silicon carbide whiskers to convert the microwave energy to thermal energy; however, any other frequency that will couple with the whiskers can be used. This temperature will be reached in five to fifteen minutes and, since the whiskers of the filter are the heating elements, the major part of the filter unit reaches the same temperature at the same time. During this heating the filter element can be supplied with air as from a source 68 or from another suitable air source to assist in the combustion process. The filter temperature, $T_F$, is monitored with any suitable device such that when the desired temperature is outside of the desired range, a signal on lead 66 to the control circuit 60 will regulate the operation of the microwave generator 62. This regeneration by microwave heating is continued for a selected time to substantially burn the volatilizable material. A coolant gas (typically atmospheric air) can be passed from the source 68 through the passages in the insulation layer if heating of the microwave cavity is detrimental. Suitable silicon carbide whiskers for use in the filter unit 12 can be produced using the following procedure as reported in U.S. Pat. No. 4,873,069 which is incorporated herein by reference. Very small fluffy silicon dioxide particles, having a very large surface area, are mixed with a fluffy carbonized material. Both of these materials have a void volume of about 40 percent or greater. The silicon dioxide particles in this mixture are about 1.5 to about 2.75 times, by weight, of the carbon fibers. The mixture is heated to a temperature of about 1600 to 1900 degrees C. for at least about 0.2 hours during which the gaseous reactions products of reactions between the two materials at the surface of the mixture are maintained at steady state by flowing an inert gas through the furnace. Preferably a catalyst from the group consisting of aluminum metal and decomposable compounds of boron, aluminum and lanthanum (or mixtures thereof) is added prior to the heating step. The following Example I more specifically describes the production of silicon carbide whiskers for use in the present invention.

EXAMPLE I

Very small (0.002 micron) fluffy silicon dioxide particles having a very large surface area (200 m$^2$/g), such as "Cab-O-Sil" manufactured by the Cabot Corporation, are intimately mixed with fully carbonized cotton fibers in a dry state. Small percentages of anhydrous boric oxide ($B_2O_3$) and powdered aluminum metal are added to the mixture to act as catalysts for the SiC whisker growth.

The mixture is loaded into a graphite synthesis container, having approximately 40% void in the closed container. The mixture is subjected to a temperature of 1700°±50° C. in an argon atmosphere for 30 to 90 minutes. The argon is constantly flowed over the container to remove the gaseous reaction by-products during the formation of the SiC whiskers.

The resultant product is greater than 98% silicon carbide containing greater than 80% separable 1-3 micron diameter silicon carbide whiskers, with the remainder being particulate and fused whisker-like material. The non-whisker material is removed from the heat treated material by mechanical separation to yield the final silicon carbide whisker product.

Whiskers produced according to this process are utilized to produce, for example, a "felt" or paper of solely silicon carbide whiskers. These layers of whiskers are then typically formed into a monolithic corrugated filter structure (12) for placement within a thermal insulation body (14) typically fabricated from fiber alumina or zirconia. The filter unit typically is a right circular cylinder five to nine inches in diameter and nine to twelve inches long. The thermal insulation sleeve typically is the same length as the filter unit, and has a typical thickness of one and one-half inches. Thus, the typical diameter of the filter-insulation assembly is about eight to twelve inches. The following Examples II and III describe typical formations of a filter element

EXAMPLE II

The silicon carbide whisker filter must meet certain criteria to remove fine particulate material from a high velocity, high temperature gas stream. These criteria present certain conflicts in material properties. The filter must have sufficient porosity to create a pressure drop of less than two inches of water in the exhaust stream. It must have porosity fine enough or surface area great enough to stop at least 85% of the particulates of 0.1 micron and larger size. Therefore, it must have a very large surface area, and a very thin wall with high enough strength to withstand the exhaust stream pressure.

High surface area is typically obtained by creating spirals or folds in the filter wall.

The formation of these geometric shapes requires a pliable form of silicon carbide whisker material. This form is obtained by making whisker paper using the whiskers prepared according to Example I. A sheet of cellulose fiber paper is formed by the well-known Fourdrinier process, with the paper being typically 0.003 to 0.025 inches thick. A sheet of whisker paper is formed, over the cellulose fiber paper, this being about 0.008 to 0.050 inches thick. A final sheet of cellulose fiber, identical to the above-described sheet, is formed over the SiC whisker paper. Thus, the SiC whisker paper is contained for support during subsequent steps.

The resultant composite is formed into either a folded or spiral array and placed in a high temperature fixture for the rigidifying of the filter. The filter and fixture are placed in a vacuum furnace and brought to approximately 1200° C. to burn out the cellulose paper. Methyl trichlorosilane and hydrogen or similar SiC forming gases are forced through the SiC paper filter wall, forming SiC, HCl and $H_2$ products. The SiC formed in this step will bond the SiC whiskers in the paper making the filter shape rigid and strong. The filter is cooled and removed from the fixture. It is then fitted into and attached to a ceramic fiber insulation outer shell. End caps adapters are then attached.

EXAMPLE III

A porous metal or plastic mold is shaped in the folded or spiral filter form. A thin (0.010-0.032 in.) cardboard preform is fitted inside of the porous mold. Silicon carbide whiskers, as formed from the process of Example I, are dispersed in a water suspension using ammonium hydroxide and Darvon C (from R. T. Vanderbilt) as dispersants, and methyl cellulose as a binder. The suspension should contain 40 to 70 wt % SiC whiskers. This suspension is agitated through the inside of the mold while a vacuum of 5 to 15 in. Hg is pulled through the mold. This vacuum forms the whiskers onto the cardboard preform to a thickness of about 0.008 to about 0.50 inches. The assembly is dried, and the cardboard preform and whisker filter are removed as a unit, ready for rigidifying.

This is accomplished by carbonizing at 800°-900° C. in argon to convert the cardboard and methyl cellulose binder to carbon particles. The furnace is then further heated to 1450°-1650° C. When this temperature is reached, the unit is sprayed with or dipped in molten silicon. This molten silicon reacts with the carbon to form silicon carbide to bond the silicon carbide whiskers to thus rigidify the filter. It then can be inserted into the thermal insulation sleeve and any end adapters applied.

The filter-insulation assembly is slidably received within the microwave cavity (20) as shown in the afore-described FIG. 2. In this configuration, the microwave energy directed into the cavity causes substantially uniform heating of the filter unit throughout a major portion of the filter. Because of this uniform heating, there is essentially no temperature gradient within the filter during the carbon burnoff and thus no potential damage during either use of the filter or the regeneration thereof. It is anticipated that the filter-insulation assembly will perform satisfactorily for at least 150,000 miles of operation for most heavy diesel-powered trucks and like vehicles. If at any time regeneration is not adequate, as determined by the differential pressure across the filter, the unit can be removed and a new filter-insulation assembly installed. Of course, if a filter is fabricated having sufficient rigidity to be handled, it alone would be replaced unless damage has occurred to the insulation.

A structure as disclosed herein will have uses for applications other than in diesel system exhausts. For example, there are many coal gassifier systems wherein the exhaust gases contain deleterious quantities of carbon-containing particulates. Further, there are fluidized bed combustors, direct coal-fired gas turbines, etc. wherein particulate material must be removed at relatively high temperature. All of these particulates can be removed using a filter-heater system as described, with the filter portion thereof being regenerated periodically (or upon demand) using the microwave heating. The silicon carbide whiskers are essentially inert to other contaminants of the gases, including Ca, Zn, P, S, Fe and oxides commonly found in diesel fuel and lubricants.

From the foregoing, it will be understood that a device has been developed that provides a monolithic filter structure for removing carbon or other combustible effluent particulate material from a gas stream. When this particulate material contains such combustibles, they can be removed from the filter by heating with microwave energy to cause the combustibles to burn and typically become carbon dioxide. Due to the particular nature of the monolithic filter, the heating is substantially uniform within the filter so that thermal gradients are essentially absent and cracking or other deleterious structural damage (caused by the thermal expansion gradients) are eliminated. The device is of particular value in the exhaust systems of diesel-fueled engines; however, it has potential value in many other fields where gaseous streams include carbon-containing particulates (or other particulates wherein an essential portion thereof can be removed by heating).

The preferred embodiment of the filter element involves the use of silicon carbide whiskers. However, other forms of silicon carbide materials that provide suitable filtration and which couple to the microwave radiation to achieve thermal energy are suitable for use in the present invention.

Although certain details are given herein in the explanation of the present invention, they are given for illustration purposes rather than to limit the invention. Thus, the invention is to be limited only by the appended claims and their equivalents.

I claim:

1. A filter-heater structure for the removal of particulate matter from a gas stream, the particulate matter being primarily volatilizable upon the application of heat, and for the regeneration of said structure, which comprises:

a monolithic filter element fabricated from silicon carbide whiskers for removal of said particulate matter from said gas stream, said silicon carbide whiskers capable of coupling with microwave radiation for converting microwave energy to thermal energy, said filter element having a nominal porosity size of about 25 micrometers ±50%;

a thermal insulation means substantially surrounding said filter element, said thermal insulation means provided with means to cool said thermal insulation means;

means for introducing said gas stream into said filter element;

means for conveying said gas stream from said filter element after removal of said particulate matter; and means for irradiating said silicon carbide whiskers of said filter element with microwave radiation of a selected frequency to couple with said silicon carbide whiskers to uniformly raise said silicon carbide whiskers of said filter element to a temperature to volatilize said volatilizable component of said particulate matter whereby said gas stream from said filter element contains said volatilized components of said particulate matter held by said filter element.

2. A method for the removal of carbon-containing particulates from a gas stream containing the same, which comprises the steps:

passing said gas stream through a monolithic filter element fabricated from silicon carbide material, said silicon carbide material capable of coupling with microwave radiation for converting microwave energy to thermal energy, said filter element having a porosity size of about 25 micrometers ±50%, said filter element removing said particulates from said gas stream;

monitoring a pressure differential across said filter element to determine collection of said particulates on said filter element;

isolating said filter element from said gas stream when said pressure differential across said filter element reaches a pre-selected upper value;

heating said silicon carbide material of said filter element with microwave energy of a selected frequency to a selected temperature for a selected time to volatilize said carbon-containing particulates to regenerate said filter element when said pressure differential reaches said pre-selected upper value indicating a maximum effective collection of said particulates on said filter element;

passing air through said filter element during said heating step to assist volatilization of said carbon-containing particulates;

exhausting volatilized carbon-containing particulates from said filter element;

ceasing said heating of said silicon carbide material of said filter element after a selected time period when regeneration of said filter element is substantially complete; and reconnecting said filter element to said gas stream to be filtered.

3. The method of claim 2 wherein said silicon carbide material is silicon carbide whiskers.

4. The method of claim 2 wherein said heating is carried out with microwave irradiation having a frequency of about 2.45 GHz and a power of about 1000 to about 3000 watts.

5. The method of claim 4 wherein said selected temperature is about 600–800 degrees C.

6. A filter-heater structure for the removal of particulate matter from a gas stream, the particulate matter being primarily volatilizable upon the application of heat, and for the regeneration of said structure, which comprises:

a monolithic filter element fabricated from silicon carbide material to remove said particulate matter from said gas stream, said silicon carbide material capable of coupling with microwave radiation for converting microwave energy to thermal energy, said filter element having a nominal porosity size of about 25 micrometers ±50%; and means for irradiating said silicon carbide material of said filter element with microwave radiation of a frequency of about 2.45 GHz and a power of about 1000 to about 3000 watts to couple with said silicon carbide material to uniformly raise said filter element to a temperature to volatilize said volatilizable component of said particulate matter retained on said filter element.

7. The structure of claim 6 wherein said silicon carbide material is silicon carbide whiskers.

8. The structure of claim 7 wherein said means for irradiating said silicon carbide whiskers of said filter element comprises:

a source of microwave energy of said frequency of about 2.45 GHz and power of about 1000 to about 3000 watts; and means for coupling said source of microwave energy to heat said silicon carbide whiskers of said filter element.

9. The structure of claim 8 wherein said means for coupling is a microwave cavity means substantially surrounding said filter element.

10. The structure of claim 9 further comprising a thermal insulation means interposed between said microwave cavity means and said filter element.

11. The structure of claim 10 wherein said thermal insulation is provided with passageways for passing cooling means through said thermal insulation means.

12. The structure of claim 8 further comprising:

means for sensing a pressure differential across said filter element as influenced by said particulate material retained on said filter element and for producing a signal related to said pressure differential; and means for energizing said source of microwave energy when said signal related to said pressure differential rises to a selected value whereby said microwave energy causes heating of said silicon carbide whiskers of said filter element and volatilization of said volatile component of said particulate matter, and de-energizes said source of microwave energy after a selected time period when regeneration of said filter element is substantially complete.

13. The structure of claim 12 further comprising a temperature measuring means associated with said filter element, said temperature measuring means for generating a signal to cause said source of microwave energy to produce a selected temperature within said filter element.

* * * * *